United States Patent Office 3,775,456
Patented Nov. 27, 1973

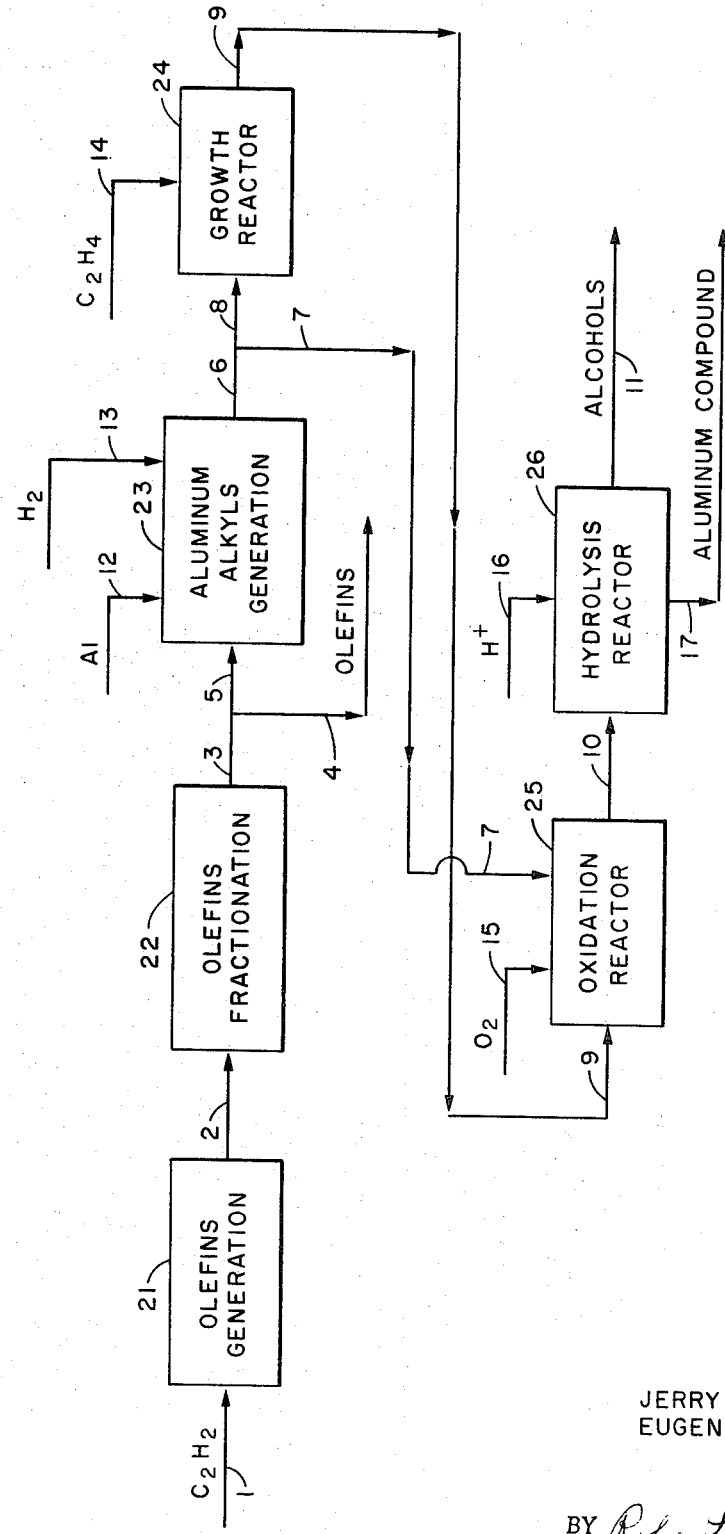

3,775,456
CONTROL OF DISTRIBUTION OF ALUMINUM ALKYLS AND PRODUCTS DERIVED THEREFROM
Jerry A. Acciarri and Eugene F. Kennedy, Ponca City, Okla., assignors to Continental Oil Company, Ponca City, Okla.
Filed Aug. 4, 1969, Ser. No. 847,091
Int. Cl. C07f 5/06
U.S. Cl. 260—448 A                14 Claims

ABSTRACT OF THE DISCLOSURE

A process for producing aluminum trialkyls of controlled alkyl chain lengths is disclosed. Ethylene is polymerized to 1-olefins which are separated into 1-olefins of selected chain lengths. The separated 1-olefins are reacted with aluminum and hydrogen to produce the aluminum trialkyls which can be subsequently grown with ethylene to increase chain lengths. The trialkyls can then be oxidized and hydrolyzed to produce primary alcohols.

BACKGROUND OF THE INVENTION (a) Field of the invention

This invention relates to preparation of aluminum alkyls. In a more limited aspect, this invention relates to a method of preparing alcohols from aluminum alkyls having a narrower range of carbon atoms in the hydrocarbon portion of the alcohol than the normal Poisson distribution.

(b) Description of prior art

In the commercial production of alcohols from aluminum alkyls, aluminum is reacted with aluminum triethyl and hydrogen to produce aluminum diethyl hydride. The aluminum diethyl hydride is alkylated with ethylene to form aluminum triethyl. For each three moles of aluminum triethyl, two are recycled to form more aluminum diethyl hydride and one is sent to a growth reactor for ethylene additions. The growth product will contain alkyl atoms per group. Therefore, the alcohols formed from such aluminum alkyls will have the same carbon atom distribution. The $C_6$ to $C_{10}$ alcohols are particularly useful, and many schemes have been proposed for altering the normal random distribution to yield the chain lengths of the desired size. Most of these methods involve complicated recycle streams and controls as well as lack of flexibility, since they involve reverse displacement and recycle of olefins.

OBJECT OF THE INVENTION

It is an object of this invention to provide a simple process for controlling the alkyl chain lengths in production of aluminum alkyls. Another object of this invention is to provide a simple method of producing alcohols of predetermined carbon atoms.

SUMMARY OF THE INVENTION

According to this invention, ethylene is converted to long chain 1-olefins, the olefins are fractionated into predetermined cuts, selected olefins are then used for alkylating aluminum, at least a portion of the resulting aluminum trialkyls are subjected to growth with additional ethylene, and the aluminum trialkyls are converted to alcohols by oxidation and hydrolysis.

DESCRIPTION OF PREFERRED EMBODIMENTS

The process of this invention can best be described by reference to the drawing. Ethylene is fed via conduit 1 to olefin generation Zone 21 where the ethylene is converted to 1-olefins under a pressure of 2,000 p.s.i. to 5,000 p.s.i., a temperature in the range 130° C. to 220° C., and in the presence of 0.5 percent to 10 percent aluminum triethyl. Alternatively, the ethylene can be converted to olefins by growth with aluminum triethyl, the growth product displaced by ethylene forming aluminum triethyl which is recycled for additional growth and 1-olefins of random chain lengths. In either case, the olefins from Zone 21 pass via Conduit 2 to olefin fractionation Zone 22. Olefins suitable for sales or of undesired chain lengths are removed via Conduit 4. The olefins to be converted to end product are passed via Conduit 5 to alkylation Zone 23 wherein they are used for alkylating aluminum from Conduit 12 in the presence of hydrogen from Conduit 13 thereby forming aluminum trialkyls. The aluminum trialkyls having alkyls of lower chain lengths than desired are passed via Conduits 6 and 8 to growth reaction Zone 24 where additional ethylene from Conduit 14 is introduced onto the alkyl groups. Those aluminum alkyls of the desired chain length are passed from Zone 23 via Conduits 6 and 7 to oxidation Zone 25. The growth product from Zone 24 is passed via Conduit 9 to oxidation Zone 25 via Conduit 9. Oxygen is fed to Zone 25 via Conduit 15 forming aluminum trialkoxide. The alkoxides from Zone 25 pass via Conduit 10 to hydrolysis Zone 26 wherein the alkoxides are converted to alcohols and aluminum compound by a hydrolyzing agent supplied via Conduit 16. The hydrolyzing agent will generally be an acid or water, depending upon the desired aluminum compound. When an acid is used, it generally is sulfuric yielding alum. Hydrochloric acid is sometimes used to produce aluminum chloride. When water is used, the aluminum compound will be alumina. In any case, the alcohols are removed via Conduit 11 and can be fractionated into individual alcohols if desired. The aluminum compound is removed via Conduit 17. The reaction conditions in each zone are not given, since the individual steps are conventional. Pumps, fractionators, and the like are not shown, as these will be conventional and well known in the art. For example, the growth product can be fractionated and separately oxidized as can Stream 7 be oxidized separately from the growth product or fractions thereof. Thus, it can be readily recognized that the process of this invention provides great flexibility in obtaining end products as desired.

To illustrate the flexibility of this invention, the following examples are given.

The process shown in the figure shows a general method of control on the distribution of aluminum alkyls and products derived from aluminum alkyls, over and above the control that currently exists in an alcohol process wherein the alcohol is produced from aluminum alkyls generally known as growth process when operated entirely on ethylene and aluminum triethyl.

A generalized process description for this distribution control is as follows (refer to the figure). The Olefins Generation Section 21 converts ethylene (1) to higher molecular weight alpha-olefins (2).

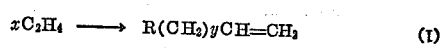

$$xC_2H_4 \longrightarrow R(CH_2)yCH=CH_2 \qquad (1)$$

This mixture of olefins (2) is fractionated in Olefins Fractionation Section 22 to produce olefin fractions (3) of either individual cuts, multiple carbon atoms cuts, or any other desirable combinations. At this point, selected alpha-olefin fractions can be made available for sale or for use as chemical intermediates (4). The desired olefins (5) for conversion to alcohols are then reacted with aluminum (12) and hydrogen (13) in the Aluminum Alkyls Generation Section 23 to form the corresponding aluminum alkyl compounds (6). The Aluminum Alkyls Generation Section 23 can be operated on individual olefin cuts, or olefin mixtures, to produce either pure aluminum alkyls or blends of aluminum alkyls, depending upon the composition of the olefin feed. The formation of the aluminum alkyls from the olefins could proceed by either the Aluminum Alkyl Hydrogenation/Alkylation Process, the Aluminum Triisobutyl/Displacement Process, or the Aluminum Diisobutyl Hydride/Alkylation Process.

Aluminum Alkyl Hydrogenation/Alkylation Process:
$$2 AlR_3 + Al + 3/2 H_2 \longrightarrow 3 HAlR_2 \quad (2)$$
$$3 HAlR_2 + 3 CH_2=CHR \longrightarrow 3 AlR_3 \quad (3)$$
$$Al + 3/2 H_2 + 3 CH_2=CHR \longrightarrow AlR_3 \quad (4)$$

Aluminum Triisobutyl/Displacement Process:
$$Al + 3/2 H_2 + 3 i\text{-}C_4H_8 \longrightarrow Al(i\text{-}C_4H_9)_3 \quad (5)$$
$$Al(i\text{-}C_4H_9)_3 + 3 CH_2=CHR \longrightarrow AlR_3 + 3 i\text{-}C_4H_8 \quad (6)$$
$$Al + 3/2 H_2 + 3 CH_2=CHR \longrightarrow AlR_3 \quad (7)$$

Aluminum Diisobutyl Hydride/Alkylation Process:
$$Al + 3/2 H_2 + 2 i\text{-}C_4H_8 \longrightarrow HAl(i\text{-}C_4H_9)_2 \quad (8)$$
$$H Al(i\text{-}C_4H_9)_2 + CH_2=CHR \longrightarrow RAl(i\text{-}C_4H_9)_2 \quad (9)$$
$$RAl(i\text{-}C_4H_9)_2 \longrightarrow RAl(i\text{-}C_4H_9)H + iC_4H_8 \quad (10)$$
$$RAl(iC_4H_9)H + CH_2=CHR \longrightarrow R_2Al(iC_4H_9) \quad (11)$$
$$R_2Al(iC_4H_9) \longrightarrow R_2AlH + iC_4H_8 \quad (12)$$
$$R_2AlH + CH_2=CHR \longrightarrow AlR_3 \quad (13)$$
$$Al + 3/2 H_2 + 3 CH_2=CHR \longrightarrow AlR_3 \quad (14)$$

The aluminum alkyls in stream (6) could, therefore, be either pure aluminum alkyl, mixtures of aluminum alkyls, or any combination thereof.

The individual aluminum alkyls (6) produced in 23 can be processed in three ways: (a) all the aluminum alkyls (8) are fed to the Growth Reactor 24 for conversion to higher aluminum alkyls (9) with ethylene (14), $$AlR_3 + \sim C_2H_4 \rightarrow AlR_3' \quad (15)$$

(b) all the aluminum alkyls (7) are fed directly to the oxidation reactor 25, or (c) a combination of (a) and (b).

In any case, the aluminum alkyls (7 and/or 9) are oxidized with air (15) in Oxidation Reactor 25 to form the corresponding aluminum alkoxides (10).

$$AlR_3' + 3/2 O_2 \rightarrow Al(OR')_3 \quad (16)$$

The aluminum alkoxides (10) are hydrolyzed with either water, acid, or base (16) in Hydrolysis Reactor 26 to form the desired alcohols and the byproduct aluminum compounds (17).

The composition differences between alcohols produced by this process and the conventional growth process are illustrated by the following examples. In these examples, the following definitions apply:

(1) Controlled alcohol distribution.—The composition of the alcohols resulting from the process scheme under discussion. Basis is 100 pounds 618 alcohol, e.g., alcohols of 6 to 18 carbon atoms.

(2) Conventional alcohol distribution.—The composition of the alcohols resulting from the aluminum triethylethylene growth reaction with an average of 3.7 ethylene additions per aluminum-carbon bond. Basis is 100 pounds 618 alcohol.

EXAMPLE NO. I

Olefins generation 21.—A process whereby ethylene is catalytically dimerized by aluminum alkyls to produce essentially 1-butene.

Olefins fractionation 22.—Produces essentially a pure stream (3) of 1-butene. No. 1-butene (4) is withdrawn from the process.

Aluminum alkyls generation 23.—Produces essentially pure aluminum tri-n-butyl (6).

Growth reactor 24.—An average of 3.1 ethylene additions per aluminum-carbon bond.

| | Lbs./100 lbs. 618 alcohol | | |
|---|---|---|---|
| | Controlled alcohol distribution | Conventional alcohol distribution | Difference |
| Alcohol carbon number: | | | |
| 2 | 0.069 | 2.331 | −2.262 |
| 4 | 2.434 | 6.707 | −4.273 |
| 6 | 9.671 | 13.929 | −4.258 |
| 8 | 18.625 | 20.278 | −1.653 |
| 10 | 23.089 | 21.997 | 1.092 |
| 12 | 20.900 | 18.793 | 2.107 |
| 14 | 14.830 | 13.176 | 1.654 |
| 16 | 8.632 | 7.814 | 0.818 |
| 18 | 4.253 | 4.010 | 0.243 |
| 20 | 1.815 | 1.811 | 0.004 |
| 22+ | 1.007 | 1.122 | −0.115 |
| Total | 105.325 | 111.970 | −6.645 |

EXAMPLE NO. II

Example IIA

Olefins generation 21.—A process whereby ethylene is polymerized to higher molecular weight alpha-olefins by catalytic quantities of aluminum alkyls and further characterized in that the resulting distribution of the olefins follows an exponential function. Composition of stream (2) is as follows:

| Olefin carbon No.: | Weight percent |
|---|---|
| 2 | 0.00 |
| 4 | 27.37 |
| 6 | 22.81 |
| 8 | 16.90 |
| 10 | 11.73 |
| 12 | 7.82 |
| 14 | 5.07 |
| 16 | 3.22 |
| 18 | 2.01 |
| 20+ | 0.01 |

Example IIA-1

Olefins fractionation 22.—The olefin stream (2) is fractionated into three cuts $C_4$–$C_6$, $C_8$–$C_{10}$, and $C_{12}+$. The $C_{12}+$ cut is removed from the process (4). The $C_4$–$C_6$ and $C_8$–$C_{10}$ cuts are treated separately for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | 0.00 | | | |
| 4 | 19.49 | 19.49 | | |
| 6 | 16.25 | 16.25 | | |
| 8 | 12.03 | | 12.03 | |
| 10 | 8.35 | | 8.35 | |
| 12 | 5.57 | | | 5.57 |
| 14 | 3.61 | | | 3.61 |
| 16 | 2.29 | | | 2.29 |
| 18 | 1.43 | | | 1.43 |
| 20+ | 2.18 | | | 2.18 |
| Total | 71.24 | 35.75 | 20.39 | 15.09 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth reactor 24.—The $C_4$–$C_6$ aluminum alkyls are reacted with ethylene such that an average of 2.6 moles ethylene is added per aluminum-carbon bond. The $C_8$–$C_{10}$ aluminum alkyls are reacted with ethylene such that an average of 0.8 mole ethylene is added per aluminum-carbon bond.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.190 | 2.331 | −1.141 |
| 4 | 3.011 | 6.707 | −3.696 |
| 6 | 8.441 | 13.929 | −5.488 |
| 8 | 20.996 | 20.278 | 0.718 |
| 10 | 27.537 | 21.997 | 5.540 |
| 12 | 21.665 | 18.793 | 2.872 |
| 14 | 12.627 | 13.176 | −0.549 |
| 16 | 6.129 | 7.814 | −1.685 |
| 18 | 2.600 | 4.010 | −1.410 |
| 20 | 0.978 | 1.811 | −0.833 |
| 22+ | 0.461 | 1.122 | −0.661 |
| Total | 105.641 | 111.970 | −6.329 |

Example IIA-2

Olefins fractionation 22.—The olefin stream (2) is fractionated into three cuts $C_4$–$C_6$, $C_8$–$C_{10}$, and $C_{12}$+. The $C_{12}$+ cut is removed from the process (4). The $C_4$–$C_6$ and the $C_8$–$C_{10}$ cuts are treated separately for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 18.04 | 18.04 | | |
| 6 | 15.04 | 15.04 | | |
| 8 | 11.14 | | 11.14 | |
| 10 | 7.73 | | 7.73 | |
| 12 | 5.16 | | | 5.16 |
| 14 | 3.34 | | | 3.34 |
| 16 | 2.12 | | | 2.12 |
| 18 | 1.32 | | | 1.32 |
| 20+ | 2.03 | | | 2.03 |
| Total | 65.92 | 33.08 | 18.87 | 13.97 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth reactor 24.—The $C_4$–$C_6$ aluminum alkyls are reacted with ethylene such that an average of 3.2 moles ethylene is added per aluminum-carbon bond. The $C_8$–$C_{10}$ aluminum alkyls are reacted with ethylene such that an average of 1.8 moles ethylene is added per aluminum-carbon bond.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.222 | 2.331 | −1.109 |
| 4 | 2.368 | 6.707 | −4.339 |
| 6 | 5.769 | 13.929 | −8.160 |
| 8 | 13.147 | 20.278 | −7.131 |
| 10 | 21.040 | 21.997 | −0.957 |
| 12 | 23.165 | 18.793 | 4.372 |
| 14 | 18.747 | 13.176 | 5.571 |
| 16 | 11.899 | 7.814 | 4.085 |
| 18 | 6.229 | 4.010 | 2.219 |
| 20 | 2.791 | 1.811 | 0.980 |
| 22+ | 1.663 | 1.122 | 0.541 |
| Total | 108.045 | 111.970 | −3.925 |

Example IIA-3

Olefins fractionation 22.—The olefin stream (2) is fractionated into individual $C_4$, $C_6$, $C_8$, $C_{10}$, and $C_{12}$+ cuts. The $C_4$–$C_8$ and the $C_6$–$C_{10}$ cuts are recombined and converted separately to aluminum alkyls. The $C_{12}$+ cut is removed from the process (4). The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 19.54 | 19.54 | | |
| 6 | 16.29 | | 16.29 | |
| 8 | 12.06 | 12.06 | | |
| 10 | 8.38 | | 8.38 | |
| 12 | 5.59 | | | 5.59 |
| 14 | 3.62 | | | 3.62 |
| 16 | 2.30 | | | 2.30 |
| 18 | 1.43 | | | 1.43 |
| 20+ | 2.19 | | | 2.19 |
| Total | 71.41 | 31.60 | 24.67 | 15.13 |

Aluminum alkyls generation 23.—The above $C_4$–$C_8$ and $C_6$–$C_{10}$ olefin cuts are converted to the corresponding aluminum alkyls. The aluminum alkyls are grown separately.

Growth reactors 24.—An average of 2.6 moles ethylene is added per aluminum-carbon bond for the $C_4$–$C_8$ aluminum alkyl. An average of 1.6 moles ethylene is added per aluminum-carbon bond for the $C_6$–$C_{10}$ alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.254 | 2.331 | −1.077 |
| 4 | 3.100 | 6.707 | −3.607 |
| 6 | 10.867 | 13.929 | −3.062 |
| 8 | 19.149 | 20.278 | −1.129 |
| 10 | 22.855 | 21.997 | 0.858 |
| 12 | 20.537 | 18.793 | 1.744 |
| 14 | 14.447 | 13.176 | 1.271 |
| 16 | 8.223 | 7.814 | 0.409 |
| 18 | 3.912 | 4.010 | −0.098 |
| 20 | 1.599 | 1.811 | −0.212 |
| 22+ | 0.829 | 1.122 | −0.293 |
| Total | 106.771 | 111.970 | −5.199 |

Example IIA-4

Olefins fractionation 22.—The olefin stream (2) is fractionated into individual $C_4$, $C_6$, $C_8$, $C_{10}$, and $C_{12}$+ cuts. The $C_4$–$C_8$ and the $C_6$–$C_{10}$ cuts are recombined and converted separately to aluminum alkyls. The $C_{12}$+ cut is removed from the process (4). The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 18.77 | 18.77 | | |
| 6 | 15.64 | | 15.64 | |
| 8 | 11.59 | 11.59 | | |
| 10 | 8.05 | | 8.05 | |
| 12 | 5.36 | | | 5.36 |
| 14 | 3.48 | | | 3.48 |
| 16 | 2.21 | | | 2.21 |
| 18 | 1.38 | | | 1.38 |
| 20+ | 2.11 | | | 2.11 |
| Total | 68.57 | 30.36 | 23.69 | 14.53 |

Aluminum alkyls generation 23.—The above $C_4$–$C_8$ and $C_6$–$C_{10}$ olefin cuts are converted to the corresponding aluminum alkyls. The aluminum alkyls are grown separately.

Growth reactors 24.—An average of 3.2 moles ethylene is added per aluminum-carbon bond for the $C_4$–$C_8$ aluminum alkyl. An average of 1.6 moles ethylene is added per aluminum-carbon bond for the $C_6$–$C_{10}$ alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.233 | 2.331 | −1.098 |
| 4 | 2.346 | 6.707 | −4.361 |
| 6 | 8.690 | 13.929 | −5.239 |
| 8 | 16.442 | 20.278 | −3.836 |
| 10 | 21.215 | 21.997 | −0.782 |
| 12 | 20.836 | 18.793 | 2.043 |
| 14 | 16.311 | 13.176 | 3.135 |
| 16 | 10.592 | 7.814 | 2.778 |
| 18 | 5.903 | 4.010 | 1.893 |
| 20 | 2.894 | 1.811 | 1.083 |
| 22+ | 2.026 | 1.122 | 0.904 |
| Total | 108.488 | 111.970 | −3.482 |

Example IIB

Olefins generation 21.—A process whereby ethylene is polymerized to higher molecular weight alpha-olefins by catalytic quantities of aluminum alkyls and further characterized in that the resulting distribution of the olefins follows an exponential function. Another typical composition of stream (2) is as follows:

Olefin carbon No.:                                  Weight percent

2 ------------------------------ ----
   4 ------------------------------ 53.33
   6 ------------------------------ 26.67
   8 ------------------------------ 11.85
  10 ------------------------------ 4.94
  12 ------------------------------ 1.98
  14 ------------------------------ 0.77
  16 ------------------------------ 0.29
  18 ------------------------------ 0.11
  20+ ----------------------------- 0.06

Example IIB-1

Olefins fractionation 22.—The olefin stream (2) is fractionated into three cuts: $C_4$–$C_6$, $C_8$–$C_{10}$, and $C_{12}$+. The $C_{12}$+ cut is removed from the process (4). The $C_4$–$C_6$ and the $C_8$–$C_{10}$ cuts are treated separately for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 26.52 | 26.52 | | |
| 6 | 13.26 | 13.26 | | |
| 8 | 5.89 | | 5.89 | |
| 10 | 2.45 | | 2.45 | |
| 12 | 0.98 | | | 0.98 |
| 14 | 0.38 | | | 0.38 |
| 16 | 0.15 | | | 0.15 |
| 18 | 0.06 | | | 0.06 |
| 20+ | | | | |
| Total | 49.70 | 39.78 | 8.34 | 1.57 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth reactor 24.—The $C_4$–$C_6$ aluminum alkyls are reacted with ethylene such that an average of 3.0 moles ethylene is added per aluminum-carbon bond. The $C_8$–$C_{10}$ aluminum alkyls are reacted with ethylene such that an average of 0.6 mole ethylene is added per aluminum-carbon bond.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.314 | 2.331 | −1.017 |
| 4 | 3.142 | 6.707 | −3.565 |
| 6 | 8.480 | 13.929 | −5.449 |
| 8 | 19.346 | 20.278 | −0.932 |
| 10 | 24.123 | 21.997 | 2.126 |
| 12 | 20.801 | 18.793 | 2.008 |
| 14 | 14.463 | 13.176 | 1.287 |
| 16 | 8.496 | 7.814 | 0.682 |
| 18 | 4.281 | 4.010 | 0.271 |
| 20 | 1.874 | 1.811 | 0.063 |
| 22+ | 1.075 | 1.122 | −0.047 |
| Total | 107.395 | 111.970 | −4.575 |

Example IIB-2

Olefins fractionation 22.—The olefin stream (2) is fractionated into three cuts: $C_4$–$C_6$, $C_8$–$C_{10}$, and $C_{12}$+. The $C_{12}$+ cut is removed from the process (4). The $C_4$–$C_6$ and the $C_8$–$C_{10}$ cuts are treated separately for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 25.10 | 25.10 | | |
| 6 | 12.55 | 12.55 | | |
| 8 | 5.58 | | 5.58 | |
| 10 | 2.32 | | 2.32 | |
| 12 | 0.93 | | | 0.93 |
| 14 | 0.36 | | | 0.36 |
| 16 | 0.14 | | | 0.14 |
| 18 | 0.05 | | | 0.05 |
| 20+ | | | | |
| Total | 47.04 | 37.65 | 7.90 | 1.49 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth reactors 24.—The $C_4$–$C_6$ aluminum alkyls are reacted with ethylene such that an average of 3.6 moles ethylene is added per aluminum-carbon bond. The $C_8$–$C_{10}$ aluminum alkyls are reacted with ethylene such that an average of 1.0 mole ethylene is added per aluminum-carbon bond.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.301 | 2.331 | −1.030 |
| 4 | 2.477 | 6.707 | −4.230 |
| 6 | 5.921 | 13.929 | −8.008 |
| 8 | 14.059 | 20.278 | −6.219 |
| 10 | 20.899 | 21.997 | −1.098 |
| 12 | 17.824 | 18.793 | −0.969 |
| 14 | 17.824 | 13.176 | 4.648 |
| 16 | 12.284 | 7.814 | 4.470 |
| 18 | 7.292 | 4.010 | 3.282 |
| 20 | 3.782 | 1.811 | 1.971 |
| 22+ | 2.829 | 1.122 | 1.707 |
| Total | 110.379 | 111.970 | −1.591 |

EXAMPLE NO. III

Example IIIA

Olefins generation 21.—A process whereby ethylene is polymerized to higher molecular weight alpha-olefins by the continuous addition of ethylene to aluminum triethyl and further characterized in that the resulting distribution of the olefins follows a Poisson relationship. A possible distribution of stream (2) is as follows:

| Olefin carbon No.: | Weight percent |
|---|---|
| 2 | 0.00 |
| 4 | 2.94 |
| 6 | 8.82 |
| 8 | 15.69 |
| 10 | 19.61 |
| 12 | 18.83 |
| 14 | 14.64 |
| 16 | 9.57 |
| 18 | 5.38 |
| 20+ | 0.02 |

Example IIIA-1

Olefins fractionation 22.—The olefin stream (2) is fractionated into three cuts: $C_4$–$C_6$, $C_8$–$C_{10}$, and $C_{12}$+. The $C_{12}$+ cut is removed from the process (4). The $C_4$–$C_6$ cut and the $C_8$–$C_{10}$ cut are treated separately for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 4.37 | 4.37 | | |
| 6 | 13.12 | 13.12 | | |
| 8 | 23.32 | | 23.32 | |
| 10 | 29.15 | | 29.15 | |
| 12 | 27.99 | | | 27.99 |
| 14 | 21.77 | | | 21.77 |
| 16 | 14.22 | | | 14.22 |
| 18 | 7.99 | | | 7.99 |
| 20+ | 6.73 | | | 6.73 |
| Total | 148.68 | 17.49 | 52.47 | 78.72 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth reactor 24.—An average of 2.6 moles ethylene is added per aluminum-carbon bond for the $C_4$–$C_6$ aluminum alkyl. An average of 0.8 mole ethylene is added per aluminum-carbon bond for the $C_8$–$C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 0.898 | 2.331 | −1.433 |
| 4 | 1.163 | 6.707 | −5.544 |
| 6 | 2.950 | 13.929 | −10.979 |
| 8 | 17.620 | 20.278 | −2.658 |
| 10 | 33.340 | 21.997 | 11.343 |
| 12 | 26.015 | 18.793 | 7.222 |
| 14 | 13.000 | 13.176 | −0.176 |
| 16 | 5.191 | 7.814 | −2.623 |
| 18 | 1.880 | 4.010 | −2.130 |
| 20 | 0.646 | 1.811 | −1.165 |
| 22+ | 0.293 | 1.122 | −0.829 |
| Total | 103.000 | 111.970 | −8.970 |

Example IIIA-2

The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 4.11 | 4.11 | | |
| 6 | 12.31 | 12.31 | | |
| 8 | 21.88 | | 21.88 | |
| 10 | 27.36 | | 27.36 | |
| 12 | 26.26 | | | 26.26 |
| 14 | 20.43 | | | 20.43 |
| 16 | 13.34 | | | 13.34 |
| 18 | 7.51 | | | 7.51 |
| 20+ | 6.32 | | | 6.32 |
| Total | 139.53 | 16.42 | 49.25 | 738.6 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth Reactor 24.—An average of 2.8 moles ethylene is added per aluminum-carbon bond for the $C_4$–$C_6$ aluminum alkyl. An average of 1.8 moles ethylene is added per aluminum alkyl-carbon bond for the $C_8$–$C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.068 | 2.331 | −1.263 |
| 4 | 1.466 | 6.707 | −5.241 |
| 6 | 2.835 | 13.929 | −11.094 |
| 8 | 9.210 | 20.278 | −11.068 |
| 10 | 20.368 | 21.997 | −1.629 |
| 12 | 25.980 | 18.793 | 7.187 |
| 14 | 21.817 | 13.176 | 8.641 |
| 16 | 13.375 | 7.814 | 5.561 |
| 18 | 6.414 | 4.010 | 2.404 |
| 20 | 2.524 | 1.811 | 0.713 |
| 22+ | 1.174 | 1.122 | 0.052 |
| Total | 106.230 | 111.970 | −5.740 |

Example IIIA-3

Olefins fractionation 22.—The olefin stream (2) is fractionated into a $C_4$–$C_6$ cut, a $C_8$ cut representing 50 percent of the total $C_8$ in the feed stream, a $C_8$–$C_{10}$ cut containing the remaining $C_8$, and a $C_{12}$+cut. The $C_{12}$+ cut is removed from the process (4). The $C_4$–$C_6$, $C_8$, and $C_8$–$C_{10}$ cuts are treated separately for conversion to aluminum alkyls.

The following fractionation is made in 22:

| | Lbs. olefin/100 lbs. 618 alcohol | | | | |
|---|---|---|---|---|---|
| | Total (3) | $C_4$–$C_6$ cut (5) | $C_8$ cut (5) | $C_8$–$C_{10}$ cut (5) | Olefin sales (4) |
| Olefin carbon number: | | | | | |
| 2 | | | | | |
| 4 | 4.22 | 4.22 | | | |
| 6 | 12.65 | 12.65 | | | |
| 8 | 22.50 | | 11.25 | 11.25 | |
| 10 | 28.12 | | | 28.12 | |
| 12 | 27.00 | | | | 27.00 |
| 14 | 20.99 | | | | 20.99 |
| 16 | 13.72 | | | | 13.72 |
| 18 | 7.71 | | | | 7.71 |
| 20+ | 6.50 | | | | 6.50 |
| Total | 143.42 | 16.87 | 11.25 | 39.37 | 75.92 |

Aluminum alkyls generation 23.—The above $C_4$–$C_6$, $C_8$, and $C_8$–$C_{10}$ olefin cuts are converted to the corresponding aluminum alkyls. The $C_4$–$C_6$ and the $C_8$–$C_{10}$ aluminum alkyl cuts are grown separately in Growth Reactors 24. The $C_8$ aluminum alkyl cut (7) bypasses the Growth Reactors 24 to the Oxidation Reactor 25.

Growth Reactor 24.—An average of 3.0 moles of ethylene is added per aluminum-carbon bond for the $C_4$–$C_6$ aluminum alkyl. An average of 2.0 moles of ethylene is added per aluminum-carbon bond for the $C_8$–$C_{10}$ cut.

ALCOHOL DISTRIBUTION (11)

| | Lbs./100 lbs. 618 alcohol | | |
| --- | --- | --- | --- |
| | Controlled alcohol distribution | Conventional alcohol distribution | Difference |
| Alcohol carbon number: | | | |
| 2 | 0.953 | 2.331 | −1.378 |
| 4 | 1.355 | 6.707 | −5.352 |
| 6 | 2.605 | 13.929 | −11.324 |
| 8 | 19.554 | 20.278 | −0.724 |
| 10 | 15.020 | 21.997 | −6.977 |
| 12 | 21.317 | 18.793 | 2.524 |
| 14 | 20.154 | 13.176 | 6.978 |
| 16 | 13.890 | 7.814 | 6.076 |
| 18 | 7.458 | 4.010 | 3.448 |
| 20 | 3.272 | 1.811 | 1.461 |
| 22+ | 1.754 | 1.122 | 0.632 |
| Total | 107.333 | 111.970 | −4.637 |

Example IIIA-4

Olefins fractionation 22.—The following fractionation is made in 22:

| | Lbs. olefin/100 lbs. 618 alcohol | | | | |
| --- | --- | --- | --- | --- | --- |
| | Total (3) | $C_4$–$C_6$ cut (5) | $C_8$ cut (5) | $C_8$–$C_{10}$ cut (5) | Olefin sales (4) |
| Olefin carbon number: | | | | | |
| 2 | | | | | |
| 4 | 4.45 | 4.45 | | | |
| 6 | 13.35 | 13.35 | | | |
| 8 | 23.74 | | 11.87 | 11.87 | |
| 10 | 29.68 | | | 29.68 | |
| 12 | 28.50 | | | | 28.54 |
| 14 | 22.16 | | | | 22.16 |
| 16 | 14.48 | | | | 14.46 |
| 18 | 8.14 | | | | 8.18 |
| 20+ | 6.86 | | | | 6.80 |
| Total | 151.37 | 17.80 | 11.87 | 41.55 | 80.13 |

Aluminum alkyls generation 23.—The above $C_4$–$C_6$, $C_8$, and $C_8$–$C_{10}$ olefin cuts are converted to the corresponding aluminum alkyls. The $C_4$–$C_6$ and the $C_8$–$C_{10}$ aluminum alkyl cuts are grown separately in Growth Reactor 24. The $C_8$ aluminum alkyl cut (7) bypasses the Growth Reactor 24 to the Oxidation Reactor 25.

Growth Reactor 24.—An average of 2.8 moles ethylene is added per aluminum-carbon bond for the $C_4$–$C_6$ aluminum alkyl. An average of 0.8 mole ethylene is added per aluminum-carbon bond for the $C_8$–$C_{10}$ aluminum alkyl.

ALCOHOL DISTRIBUTION (11)

| | Lbs./100 lbs. 618 alcohol | | |
| --- | --- | --- | --- |
| | Controlled alcohol distribution | Conventional alcohol distribution | Difference |
| Alcohol carbon number: | | | |
| 2 | 0.797 | 2.331 | −1.534 |
| 4 | 1.119 | 6.707 | −5.588 |
| 6 | 2.981 | 13.929 | −10.948 |
| 8 | 25.644 | 20.278 | 5.366 |
| 10 | 28.206 | 21.997 | 6.209 |
| 12 | 23.783 | 18.793 | 4.990 |
| 14 | 12.405 | 13.176 | −0.771 |
| 16 | 5.099 | 7.814 | −2.715 |
| 18 | 1.881 | 4.010 | −2.129 |
| 20 | 0.653 | 1.811 | −1.158 |
| 22+ | 0.298 | 1.122 | −0.824 |
| Total | 102.866 | 111.970 | −9.104 |

Example IIIA-5

Olefins fractionation 22.—The olefin stream (2) is fractionated into a $C_4$–$C$ cut, a $C_8$ cut, a $C_{10}$ cut, and a $C_{12}+$ cut. The $C_{12}+$ cut is removed from the process (4). The $C_4$–$C_6$, $C_8$, and $C_{10}$ cuts are treated separately for conversion to aluminum alkyls.

The following fractionation is made in 22:

| | Lbs. olefin/100 lbs. 618 alcohol | | | | |
| --- | --- | --- | --- | --- | --- |
| | Total (3) | $C_4$–$C_6$ cut (5) | $C_8$ cut (5) | $C_{10}$ cut (5) | Olefin sales (4) |
| Olefin carbon number: | | | | | |
| 2 | | | | | |
| 4 | 4.53 | 4.53 | | | |
| 6 | 13.60 | 13.60 | | | |
| 8 | 24.18 | | 24.18 | | |
| 10 | 30.22 | | | 30.22 | |
| 12 | 29.02 | | | | 29.02 |
| 14 | 22.56 | | | | 22.56 |
| 16 | 14.74 | | | | 14.74 |
| 18 | 8.28 | | | | 8.28 |
| 20+ | 6.99 | | | | 6.99 |
| Total | 154.13 | 18.13 | 24.18 | 30.22 | 81.60 |

Aluminum alkyls generation 23.—The above $C_4$–$C_6$, $C_8$, and $C_{10}$ cuts are converted to the corresponding aluminum alkyl. The $C_4$–$C_6$ and the $C_{10}$ aluminum alkyls are grown separately in Growth Reactors 24. The $C_8$ aluminum alkyl cut (1) bypasses Growth Reactor 24 to the Oxidation Reactor 25.

Growth reactor 24.—An average of 2.6 moles of ethylene is added per aluminum-carbon bond for the $C_4$–$C_6$ aluminum alkyl. An average of 0.8 mole of ethylene is added per aluminum-carbon bond for the $C_{10}$ aluminum alkyl.

| | Lbs./100 lbs. 618 alcohol | | |
| --- | --- | --- | --- |
| | Controlled alcohol distribution | Conventional alcohol distribution | Difference |
| Alcohol carbon number: | | | |
| 2 | 0.690 | 2.331 | −1.641 |
| 4 | 1.073 | 6.707 | −5.634 |
| 6 | 3.013 | 13.929 | −10.916 |
| 8 | 33.959 | 20.278 | 13.681 |
| 10 | 22.880 | 21.997 | 0.883 |
| 12 | 21.468 | 18.793 | 2.675 |
| 14 | 11.788 | 13.176 | −1.388 |
| 16 | 5.001 | 7.814 | −2.813 |
| 18 | 1.881 | 4.010 | −2.129 |
| 20 | 0.659 | 1.811 | −1.152 |
| 22+ | 0.304 | 1.122 | −0.818 |
| Total | 102.717 | 111.970 | −9.253 |

Example IIIA-6

Olefins fractionation 22.—The following fractionation is made in 22:

| | Lbs. olefin/100 lbs. 618 alcohol | | | | |
| --- | --- | --- | --- | --- | --- |
| | Total (3) | $C_4$–$C_6$ cut (5) | $C_8$ cut (5) | $C_{10}$ cut (5) | Olefin sales (4) |
| Olefin carbon number: | | | | | |
| 2 | | | | | |
| 4 | 4.33 | 4.33 | | | |
| 6 | 13.01 | 13.01 | | | |
| 8 | 23.12 | | 23.12 | | |
| 10 | 28.90 | | | 28.90 | |
| 12 | 27.74 | | | | 27.74 |
| 14 | 21.57 | | | | 21.57 |
| 16 | 14.10 | | | | 14.10 |
| 18 | 7.93 | | | | 7.93 |
| 20+ | 6.68 | | | | 6.68 |
| Total | 147.36 | 17.34 | 23.12 | 28.90 | 78.02 |

Aluminum alkyls generation 23.—The above $C_4$–$C_6$, $C_8$, and $C_{10}$ cuts are converted to the corresponding aluminum alkyl. The $C_4$–$C_6$ and the $C_{10}$ aluminum alkyls are grown separately in Growth Reactors 24. The $C_8$ aluminum alkyl cut (7) bypasses growth Reactor 24 to the Oxidation Reactor 25.

Growth reactors 24.—An average of 3.6 moles of ethylene is added per aluminum-carbon bond for the $C_4$–$C_6$ aluminum alkyl. An average of 2.0 moles of ethylene is added per aluminum-carbon bond for the $C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 0.810 | 2.331 | −1.521 |
| 4 | 1.135 | 6.707 | −5.572 |
| 6 | 1.964 | 13.929 | −11.965 |
| 8 | 30.397 | 20.278 | 10.119 |
| 10 | 10.294 | 21.997 | −11.703 |
| 12 | 17.115 | 18.793 | −1.678 |
| 14 | 18.174 | 13.176 | 4.998 |
| 16 | 13.835 | 7.814 | 6.021 |
| 18 | 8.212 | 4.010 | 4.202 |
| 20 | 4.030 | 1.811 | 2.219 |
| 22+ | 2.667 | 1.122 | 1.545 |
| Total | 108.863 | 111.970 | −3.107 |

Example IIIB

Olefins generation 21.—A process whereby ethylene is polymerized to higher molecular weight alpha-olefins by the continuous addition of ethylene to aluminum triethyl and further characterized in that the resulting distribution of the olefins follows a Poisson relationship. A possible distribution of stream (2) is as follows:

| Olefin carbon no.: | Weight percent |
|---|---|
| 2 | — |
| 4 | 12.01 |
| 6 | 22.51 |
| 8 | 25.02 |
| 10 | 19.55 |
| 12 | 11.73 |
| 14 | 5.70 |
| 16 | 2.32 |
| 18 | 0.82 |
| 20+ | 0.05 |

Example IIIB-1

Olefins fractionation 22.—The olefin stream (2) is fractionated into three cuts: $C_4$–$C_6$, $C_8$–$C_{10}$, and $C_{12}$+. The $C_{12}$+ cut is removed from the process (4). The $C_4$–$C_6$ cut and the $C_8$–$C_{10}$ cut are treated separated for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 9.61 | 9.61 | | |
| 6 | 18.01 | 18.01 | | |
| 8 | 20.02 | | 20.02 | |
| 10 | 15.64 | | 15.64 | |
| 12 | 9.38 | | | 9.38 |
| 14 | 4.56 | | | 4.56 |
| 16 | 1.86 | | | 1.86 |
| 18 | 0.65 | | | 0.65 |
| 20+ | 0.27 | | | 0.27 |
| Total | 80.00 | 27.62 | 35.66 | 16.73 |

Aluminum alkyls generation 3.—The above $C_4$–$C_6$ and $C_8$–$C_{10}$ olefin cuts are converted to the corresponding aluminum alkyls. The aluminum alkyls are grown separately.

Growth reactors 24.—An average of 2.6 moles ethylene is added per aluminum-carbon bond for the $C_4$–$C_6$ aluminum alkyl. An average of 0.8 mole ethylene is added per aluminum-carbon bond for the $C_8$–$C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.039 | 2.331 | −1.292 |
| 4 | 1.881 | 6.707 | −4.826 |
| 6 | 5.235 | 13.929 | −8.694 |
| 8 | 20.146 | 20.278 | −0.132 |
| 10 | 30.184 | 21.997 | 8.187 |
| 12 | 23.400 | 18.793 | 4.607 |
| 14 | 12.802 | 13.176 | −0.374 |
| 16 | 5.838 | 7.814 | −1.976 |
| 18 | 2.385 | 4.010 | −1.625 |
| 20 | 0.886 | 1.811 | −0.925 |
| 22+ | 0.420 | 1.122 | −0.702 |
| Total | 104.217 | 111.970 | −7.753 |

Example IIIB-2

Olefins fractionation 22.—The olefin stream (2) is fractionated into three cuts: $C_4$–$C_6$, $C_8$–$C_{10}$, and $C_{12}$+. The $C_{12}$+ cut is removed from the process (4). The $C_4$–$C_6$ cut and the $C_8$–$C_{10}$ cut are treated separately for conversion to aluminum alkyls. The following fractionation is made in 22:

| | Lbs. olefin/100 lbs. 618 alcohols | | | |
|---|---|---|---|---|
| | Total (3) | $C_4$–$C_6$ cut (5) | $C_8$–$C_{10}$ cut (5) | Olefin sales (4) |
| Olefin carbon number: | | | | |
| 2 | | | | |
| 4 | 9.00 | 9.00 | | |
| 6 | 16.86 | 16.86 | | |
| 8 | 18.74 | | 18.74 | |
| 10 | 14.64 | | 14.64 | |
| 12 | 8.78 | | | 8.78 |
| 14 | 4.27 | | | 4.27 |
| 16 | 1.74 | | | 1.74 |
| 18 | 0.61 | | | 0.61 |
| 20+ | 0.26 | | | 0.26 |
| Total | 74.93 | 25.86 | 33.38 | 15.67 |

Aluminum alkyls generation 23.—The above $C_4$–$C_6$ and $C_8$–$C_{10}$ olefin cuts are converted to the corresponding aluminum alkyls. The aluminum alkyls are grown separately.

Growth Reactors 24.—An average of 3.0 moles ethylene is added per aluminum-carbon bond for the $C_4$–$C_6$ aluminum alkyl. An average of 1.8 moles ethylene is added per aluminum-carbon bond for the $C_8$–$C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.144 | 2.331 | −1.187 |
| 4 | 1.860 | 6.707 | −4.847 |
| 6 | 4.171 | 13.929 | −9.758 |
| 8 | 11.501 | 20.278 | −8.777 |
| 10 | 21.178 | 21.997 | −0.819 |
| 12 | 24.662 | 18.793 | 5.869 |
| 14 | 20.031 | 13.176 | 6.855 |
| 16 | 12.333 | 7.814 | 4.519 |
| 18 | 6.113 | 4.010 | 2.103 |
| 20 | 2.548 | 1.811 | 0.737 |
| 22+ | 1.339 | 1.122 | 0.217 |
| Total | 106.881 | 111.970 | −5.089 |

Example IIIC

Olefins generation 21.—A process whereby ethylene is polymerized to higher molecular weight alpha-olefins by the continuous addition of ethylene to aluminum triethyl and further characterized in that the resulting distribution of the olefins follows a Poisson relationship. A possible distribution of stream (2) is as follows:

| Olefin carbon No.: | Weight percent |
|---|---|
| 2 | ---- |
| 4 | 20.66 |
| 6 | 29.44 |
| 8 | 24.85 |
| 10 | 14.76 |
| 12 | 6.74 |
| 14 | 2.49 |
| 16 | 0.77 |
| 18 | 0.21 |
| 20+ | 0.08 |

Olefins fractionation 22.—The olefin stream (2) is fractionated and recombined as shown in the following table:

| | Lbs. olefin/100 lbs. 618 alcohol | | | |
|---|---|---|---|---|
| | Total (3) | $C_4$–$C_6$ cut (5) | $C_6$–$C_8$–$C_{10}$ cut (5) | $C_8$–$C_{12}$–$C_{14}$ cut (5) | Olefin sales (4) |
| Olefin carbon number: | | | | | |
| 2 | | | | | |
| 4 | 13.81 | 13.81 | | | |
| 6 | 19.67 | 4.92 | 14.75 | | |
| 8 | 16.62 | | 4.16 | 12.46 | |
| 10 | 9.86 | | 9.86 | | |
| 12 | 4.50 | | | 1.12 | 3.38 |
| 14 | 1.66 | | | 0.42 | 1.24 |
| 16 | 0.51 | | | | 0.51 |
| 18 | 0.14 | | | | 0.14 |
| 20+ | 0.04 | | | | 0.04 |
| Total | 66.81 | 18.73 | 28.77 | 14.00 | 5.31 |

Aluminum alkyls generation 23.—The above $C_4$–$C_6$, $C_6$–$C_8$–$C_{10}$, and $C_8$–$C_{12}$–$C_{14}$ cuts are converted to the corresponding aluminum alkyls. The $C_4$–$C_6$ and the $C_6$–$C_8$–$C_{10}$ aluminum alkyl cuts are grown separately in Growth Reactors 24. The $C_8$–$C_{12}$–$C_{14}$ aluminum alkyl cut (7) bypasses the Growth Reatcors 24 to Oxidation Reactor 25.

Growth Reactors 24.—An average of 2.5 moles ethylene is added per aluminum-carbon bond for the $C_4$–$C_6$ aluminum alkyl.

An average of 2.0 moles ethylene is added per aluminum-carbon bond for the $C_6$–$C_8$–$C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.052 | 2.331 | −1.279 |
| 4 | 2.521 | 6.707 | −4.186 |
| 6 | 8.149 | 13.929 | −5.780 |
| 8 | 29.696 | 20.278 | 9.418 |
| 10 | 19.324 | 21.997 | −2.673 |
| 12 | 19.032 | 18.793 | −0.239 |
| 14 | 13.122 | 13.176 | −0.054 |
| 16 | 7.209 | 7.814 | −0.605 |
| 18 | 3.367 | 4.010 | −0.643 |
| 20 | 1.322 | 1.811 | −0.489 |
| 22+ | 0.618 | 1.122 | −0.504 |
| Total | 105.414 | 111.970 | −6.556 |

Example IIID

Olefins generation 21.—A process whereby ethylene is polymerized to higher molecular weight alpha-olefins by the continuous addition of ethylene to aluminum triethyl and further characterized in that the resulting distribution of the olefins follows a Poisson relationship. A possible distribution of stream (2) is as follows:

| Olefin carbon No.: | Weight percent |
|---|---|
| 2 | ---- |
| 4 | 10.00 |
| 6 | 20.24 |
| 8 | 24.28 |
| 10 | 20.49 |
| 12 | 13.28 |
| 14 | 6.97 |
| 16 | 3.08 |
| 18 | 1.17 |
| 20+ | 0.49 |

Olefins fractionation 22.—The olefin stream (2) is fractionated into pure fractions and recombined as shown in the following table:

| | Lbs. olefin/100 lbs. 618 alcohol | | | | |
|---|---|---|---|---|---|
| | Total (3) | $C_4$–$C_6$ cut (5) | $C_6$–$C_8$–$C_{10}$ cut (5) | $C_8$–$C_{12}$–$C_{14}$ Cut (5) | Olefin sales (4) |
| Olefin carbon number: | | | | | |
| 2 | | | | | |
| 4 | 7.17 | 7.17 | | | |
| 6 | 14.52 | 10.89 | 3.63 | | |
| 8 | 17.42 | | 13.07 | 4.35 | |
| 10 | 14.70 | | 14.70 | | |
| 12 | 9.52 | | | 7.14 | 2.38 |
| 14 | 5.00 | | | 3.75 | 1.25 |
| 16 | 2.20 | | | | 2.20 |
| 18 | 0.84 | | | | 0.84 |
| 20+ | 0.39 | | | | 0.39 |
| Total | 71.77 | 18.06 | 31.40 | 15.24 | 7.07 |

Aluminum alkyl generation 23.—The above $C_4$–$C_6$, $C_5$–$C_8$–$C_{10}$, and $C_8$–$C_{12}$–$C_{14}$ cuts are converted to the corresponding aluminum alkyls. The $C_4$–$C_6$ and the $C_6$–$C_8$–$C_{10}$ aluminum alkyl cuts are grown separately in Growth Reactors 24. The $C_8$–$C_{12}$–$C_{14}$ aluminum alkyl cut (7) bypasses the Growth Reactors 24 to Oxidation Reactor 25.

Growth reactors 24.—An average of 3.5 moles ethylene is added per aluminum-carbon bond for the $C_4$–$C_6$ aluminum alkyl. An average of 3.0 moles ethylene is added per aluminum-carbon bond for the $C_6$–$C_8$–$C_{10}$ aluminum alkyl.

ALCOHOL DISTRIBUTION (11)

| | Lbs./100 lbs. 618 alcohol | | |
|---|---|---|---|
| | Controlled alcohol distribution | Conventional alcohol distribution | Difference |
| Alcohol carbon number: | | | |
| 2 | 1.005 | 2.331 | −1.326 |
| 4 | 1.576 | 6.707 | −5.131 |
| 6 | 3.047 | 13.929 | −10.882 |
| 8 | 11.556 | 20.278 | −8.712 |
| 10 | 12.031 | 21.997 | −9.966 |
| 12 | 24.688 | 18.793 | 5.895 |
| 14 | 22.243 | 13.176 | 9.067 |
| 16 | 15.522 | 7.814 | 7.708 |
| 18 | 10.796 | 4.010 | 6.786 |
| 20 | 6.286 | 1.811 | 4.475 |
| 22+ | 5.266 | 1.122 | 4.144 |
| Total | 114.034 | 111.970 | 2.064 |

The preceding examples illustrate that the distribution control of the aluminum alkyls and alcohols derived from aluminum alkyls can be effected by any of, or combinations of, the following:

(1) The process (A) whereby ethylene is converted to higher molecular weight alpha-olefins which results in various and different compositions of the olefin product (2);

(2) The fractionation of the olefin mixture (2) into various fractions which allows the formation of those desired aluminum alkyls for further processing (6) and/or allows various olefins to be removed from the process (4) for use as chemical intermediates and/or sales;

(3) The process of the aluminum alkyls derived from the alpha-olefins such that they may be (a) grown with ethylene to higher molecular weight aluminum alkyls, (b) oxidized to the aluminum alkoxides without further growth with ethylene, and (c) combinations of (a) and (b);

(4) The addition of ethylene to the aluminum alkyl fractions in the Growth Reactors 24.

Having thus described the application, we claim:

1. A process for producing aluminum trialkyls of controlled chain length and distribution comprising:
   (a) polymerizing ethylene to form a stream containing higher 1-olefins;
   (b) fractionating the stream of higher 1-olefins and recovering at least one stream of 1-olefins of preselected chain lengths for further processing;
   (c) reacting the recovered 1-olefins of preselected chain lengths with aluminum and hydrogen and forming aluminum trialkyls wherein the alkyl groups correspond to the preselected chain lengths; and
   (d) reacting at least a portion of the thus formed aluminum trialkyls with ethylene in a growth reaction.

2. The process of claim 1 wherein the ethylene is polymerized to form 1-olefins under pressure and temperature in the presence of aluminum triethyl as catalyst.

3. The process of claim 2 wherein the ethylene is dimerized to 1-butene in step (a) and all of the aluminum trialkyls from step (c) are subjected to growth.

4. The process of claim 2 wherein the resulting distribution of the 1-olefins from step (a) is characterized in that said distribution follows an exponential function.

5. A process for producing aluminum trialkyls of controlled chain length and distribution comprising:
   (a) polymerizing ethylene to form a stream containing higher 1-olefins;
   (b) fractionating the stream of higher 1-olefins into a $C_4$–$C_6$ cut, a $C_8$–$C_{10}$ cut and a $C_{12}+$ cut;
   (c) removing the $C_{12}+$ cut from the process;
   (d) reacting the 1-olefins of the $C_4$–$C_6$ cut and the $C_8$–$C_{10}$ cut with aluminum and hydrogen and forming the corresponding aluminum trialkyls; and
   (e) reacting at least a portion of the thus formed aluminum trialkyls with ethylene in a growth reaction.

6. The process of claim 5 wherein the 1-olefins of the $C_4$–$C_6$ cut and the $C_8$–$C_{10}$ cut are separately reacted in step (d) to form corresponding aluminum trialkyls.

7. The process of claim 6 wherein the $C_4$–$C_6$ trialkyl aluminum and the $C_8$–$C_{10}$ trialkyl aluminum are grown separately.

8. The process of claim 7 wherein the $C_4$–$C_6$ trialkyl aluminum have an average of 2.6 to 3.6 moles of ethylene added per aluminum carbon bond during growth and the $C_8$–$C_{10}$ trialkyl aluminum have an average of 0.6 to 2.0 moles of ethylene added per aluminum-carbon bond during growth.

9. A process for producing aluminum trialkyls of controlled chain length and distribution comprising:
   (a) polymerizing ethylene to form a stream containing higher 1-olefins;
   (b) fractionating the stream of higher 1-olefins and recovering a $C_4$–$C_6$ 1-olefin cut, a $C_8$ 1-olefin cut, a $C_{10}$ 1-olefin cut and a $C_{12}+$ 1-olefin cut;
   (c) removing the $C_{12}+$ 1-olefins cut from the process;
   (d) reacting the $C_4$–$C_6$ 1-olefins cut, the $C_8$ 1-olefin cut and the $C_{10}$ 1-olefin cut with aluminum and hydrogen and forming the corresponding aluminum trialkyls; and
   (e) reacting at least a portion of the thus formed aluminum trialkyls with ethylene in a growth reaction.

10. The process of claim 9 wherein each 1-olefin cut is separately reacted to form the corresponding aluminum trialkyl and separately grown with ethylene.

11. The process according to claim 1 wherein the aluminum trialkyls from the growth reaction of step (d) are oxidized and then hydrolyzed.

12. The process of claim 5 wherein the aluminum trialkyls from the growth reaction of step (e) are oxidized and hydrolyzed.

13. The process of claim 9 wherein the $C_8$ trialkyl aluminum formed in step (d) is oxidized and hydrolyzed without being subjected to the growth reaction of step (e).

14. The process of claim 13 wherein the remaining aluminum trialkyls formed in step (d) are subjected to the growth reaction of step (e) followed by oxidation and hydrolyzation.

References Cited
UNITED STATES PATENTS

| | | | |
|---|---|---|---|
| 3,391,175 | 7/1968 | Davis | 260—448 A |
| 3,077,490 | 2/1963 | Fernald | 260—448 A |
| 2,863,896 | 12/1958 | Johnson | 260—448 A |
| 3,423,444 | 1/1969 | Atwood | 260—448 A |
| 3,384,651 | 5/1968 | Davis | 260—448 A |
| 3,415,861 | 12/1968 | Davis et al. | 260—448 A |
| 3,032,574 | 5/1962 | Ziegler et al. | 260—448 A |
| 2,781,410 | 2/1957 | Ziegler et al. | 260—448 A |

HELEN M. S. SNEED, Primary Examiner

U.S. Cl. X.R.

260—448 AD, 632 D